United States Patent
Xiao et al.

(10) Patent No.: US 10,367,637 B2
(45) Date of Patent: Jul. 30, 2019

(54) MODULAR EXPONENTIATION WITH TRANSPARENT SIDE CHANNEL ATTACK COUNTERMEASURES

(71) Applicant: QUALCOMM Incorporated, San Diego, CA (US)

(72) Inventors: Lu Xiao, San Diego, CA (US); Jing Deng, Santa Clara, CA (US); Justin Yongjin Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 359 days.

(21) Appl. No.: 15/217,760

(22) Filed: Jul. 22, 2016

(65) Prior Publication Data

US 2018/0026782 A1 Jan. 25, 2018

(51) Int. Cl.
*G06F 7/72* (2006.01)
*G06F 21/75* (2013.01)
(Continued)

(52) U.S. Cl.
CPC ............ *H04L 9/002* (2013.01); *G06F 21/75* (2013.01); *G06F 21/755* (2017.08); *H04L 9/003* (2013.01);
(Continued)

(58) Field of Classification Search
CPC ..... H04L 9/003; H04L 9/002; H04L 2209/12; G06F 7/723; G06F 7/72;
(Continued)

(56) References Cited

U.S. PATENT DOCUMENTS 5,588,061 A * 12/1996 Ganesan ................ H04L 9/085
380/285
7,860,242 B2 12/2010 Villegas et al.
(Continued)

FOREIGN PATENT DOCUMENTS

EP 2806371 A1 11/2014

OTHER PUBLICATIONS

Han M., et al., "An Improved Montgomery Window Algorithm on Modular Exponentiation Secure against Side Channel Attacks," Aug. 2013, Retrieved dated on Apr. 27, 2016, Retrieved from the Internet URL: https://www.researchgate.net/publication/272065985_An_Improved_Montgomery_Window_Algorithm_on_Modular_Exponentiation_Secure_against_Side_Channel_Attacks , 4 pages.
(Continued)

*Primary Examiner* — Tae K Kim
(74) *Attorney, Agent, or Firm* — Loza & Loza LLP

(57) ABSTRACT

A method of implementing security in a modular exponentiation function for cryptographic operations is provided. A key is obtained as a parameter when the modular exponentiation function is invoked. The key may be one of either a public key or a private key of a cryptographic key pair. Within the modular exponentiation function, the method ascertains whether the key is greater than L bits long, where L is a positive integer. A countermeasure against an attack is implemented if the key is greater than L bits long. The countermeasure may include one or more techniques (e.g., hardware and/or software techniques) that inhibit or prevent information about the key from being ascertained through analysis. One or more exponentiation operations may then be performed using the key. The same modular exponentiation function may be used to perform encryption and decryption operations but with different keys.

25 Claims, 6 Drawing Sheets

(51) Int. Cl.
 *H04L 9/00* (2006.01)
 *H04L 9/30* (2006.01)
(52) U.S. Cl.
 CPC ............. *H04L 9/302* (2013.01); *G06F 7/72* (2013.01); *H04L 2209/12* (2013.01)
(58) Field of Classification Search
 CPC ..... G06F 2207/7261; G06F 2207/7223; G06F 2207/7219; G06F 21/75; G06F 21/755
 See application file for complete search history.

(56) References Cited

U.S. PATENT DOCUMENTS

| | | | |
|---|---|---|---|
| 8,639,944 B2 | 1/2014 | Vigilant | |
| 10,229,264 B2* | 3/2019 | Teglia | G06F 21/52 |
| 2005/0169462 A1* | 8/2005 | Jung | G06F 7/725 |
| | | | 380/28 |
| 2011/0131424 A1* | 6/2011 | Vigilant | G06F 7/723 |
| | | | 713/189 |
| 2012/0159187 A1 | 6/2012 | Liu et al. | |
| 2013/0073873 A1* | 3/2013 | Morioka | H04L 9/003 |
| | | | 713/193 |
| 2013/0279692 A1* | 10/2013 | Bevan | G06F 7/723 |
| | | | 380/46 |
| 2014/0016772 A1* | 1/2014 | Yajima | H04L 9/003 |
| | | | 380/28 |
| 2014/0281573 A1* | 9/2014 | Jaffe | G06F 21/72 |
| | | | 713/189 |
| 2015/0082047 A1* | 3/2015 | Ozturk | H04L 9/3006 |
| | | | 713/189 |
| 2016/0087802 A1* | 3/2016 | Peeters | G06F 7/725 |
| | | | 713/176 |
| 2016/0277179 A1* | 9/2016 | Tunstall | G09C 1/00 |
| 2017/0010866 A1* | 1/2017 | Kaluzhny | G06F 21/602 |

OTHER PUBLICATIONS

Shantilal A.C., "A Faster Hardware Implementation of RSA Algorithm," pp. 1-4.
<Span style="font-family: calibri;">Alkar A.Z., et al., "A Hardware Version of the RSA using the Montgomery's Algorithm with Systolic Arrays," Integration, the VLSI Journal, North-Holland Publishing Company, Dec. 1, 2004, vol. 38 (2), pp. 299-307, XP004652459.
International Search Report and Written Opinion—PCT/US2017/042192—ISA/EPO—dated Oct. 17, 2017.
Nedospasov D., "Simple Power Analysis of RSA in Hardware," Apr. 4, 2011, XP055412820, Retrieved from the Internet: URL: http://www.isti.tu-berlin.de/fileadmin/fg214/finished_theses/nedospasov/ba-nedospasov.pdf [retrieved on Oct. 5, 2017].

* cited by examiner

*Exemplary Cryptographic Exponentiation Operations*

Encrypting: obtain a data m, a key, and a modulus n, wherein the exponentiation operation encrypts the data m to obtain ciphertext c, where $c = m^{kpub}$ modulo n, and kpub = key. — 502

Decrypting: obtain a data c, a key, and a modulus n, wherein the exponentiation operation decrypts the data c to obtain a data m, where $c = m^{kpub}$ modulo n, and kpub = key. — 504

Signing: obtain a message m, a key, and a modulus n, and the exponentiation operation signs the message m with a private key kpriv to obtain a signature s, where $s = m^{kpriv}$ modulo n, and kpriv = key. — 506

Authenticating: obtain a signature s, a key, and a modulus n, and the exponentiation operation authenticates the signature s with a public key kpub to obtain a message m, where $m = s^{kpub}$ modulo n, and kpub = key. — 508

*FIG. 5*

MODULAR EXPONENTIATION WITH TRANSPARENT SIDE CHANNEL ATTACK COUNTERMEASURES

BACKGROUND

Field

One or more features relate to confidentiality protection, authentication, cryptographic key generation, and more particularly to countermeasures against side channel attacks seeking to expose the cryptographic key or information that may be used to expose the cryptographic key.

Background

Public-key cryptography, or asymmetric cryptography, is a cryptographic system that uses two kinds of keys: public keys that may be disseminated widely, while private keys are known only to the owner. In a public-key cryptographic system, a message may be encrypted using the public key (e.g., distributed to anyone), but such a message can be decrypted only with the corresponding private key.

Many such cryptographic systems, such as Rivest-Shamir-Adleman (RSA) and Diffie-Hellman key agreement algorithms, use modular exponentiation as basic operations. In modular exponentiation, a type of exponentiation is performed over a modulus. In one example, a modular exponentiation operation calculates the remainder when an integer b (the base) raised to the eth power (the exponent), $b^e$, is divided by a positive integer m (the modulus). Generally, cryptographic systems employ (a) a public exponent (also known as a public key), (b) a private exponent (also known as a private key), and (c) a common modulus (used both with the private and public keys). The private exponents (private keys) used in these ciphers are usually vulnerable to side channel analysis, e.g., power analysis and timing analysis. Side channel attacks allow an attacker to recover information about the input to a cryptographic operation, by measuring something other than the algorithm's result, e.g., power consumption, computation time, or radio-frequency emanations by a device. Such side channel analysis seeks to expose, for example, the private exponent (private key), thereby allowing an attacker to access content encrypted with the corresponding public key.

One typical way to frustrate Simple Power Analysis (SPA) is a Montgomery Ladder. To frustrate Differential Power Analysis (DPA), blinding is usually required to hide power information leakage. All these countermeasures slow down the performance of exponentiation in a manner hard for attackers to exploit. However, the overall speed of the modular exponentiation function is affected (i.e., operations take a longer time). Recent advances in side channel attacks trigger the necessity for blinding a base and/or modulus as additional protection when needed.

On the other hand, public exponents in a cipher system do not need countermeasures. As a result, cipher systems typically make special arrangements to add countermeasures only when private exponents are sought. It becomes a case by case effort to change each cipher's usage of private key.

Many security software modules and/or libraries use the same basic modular exponentiation function call for public and private ciphers (encryption/decryption). To distinguish between public keys or ciphers and private keys or ciphers, in one example, a cryptographic library may use a flag in the cipher context to indicate a countermeasure requirement (e.g., countermeasures for private ciphers). Before the modular exponentiation function call, another function is called to turn a countermeasure flag On or Off (e.g., on for private ciphers, off for public ciphers). The flag usually needs to be reset prior to invoking the modular exponentiation function call again. Therefore, those invoking a modular exponentiation function need to have knowledge of such flag in order to ensure countermeasures are enabled, which cannot always be assumed.

An alternate and simple, but costly, way to use a single modular exponentiation function is to always enable countermeasures in a low level application programming interface (API) when executing or invoking the modular exponentiation function. However, the penalty is on public key usage which is slowed down without any security gain. Since a public key is supposed to be known by everyone, including attackers, nothing is gained by enabling countermeasures when generating the public exponent or public key.

Consequently, a way is needed to protect private key generation and/or usage but avoid performance penalty on public key generation and/or usage when using a single modular exponentiation function.

SUMMARY

A method of implementing security in a modular exponentiation function for cryptographic operations is provided. The same modular exponentiation function may perform encryption and decryption operations but with different keys. A may be obtained as a parameter when the modular exponentiation function is invoked. The key may be one of either a public key or a private key of a cryptographic key pair. Within the modular exponentiation function, the method ascertains whether the key is greater than L bits long, where L is a positive integer. For instance, L=3 bytes or 24 bits. A countermeasure is then implemented against an attack if the key is greater than L bits long. The countermeasure may include one or more techniques that inhibit or prevent information about the key from being ascertained through analysis. Otherwise the countermeasure may be bypassed if the key is less than or equal to L bits long. One or more exponentiation operations may then be performed using the key.

In various examples, the countermeasure may include hardware-based and/or software-based countermeasures. For instance, the countermeasure may include cryptographic blinding of the key. In other instances, implementing the countermeasure may include at least one of: (a) switching to a power-equalization circuit that utilizes approximately the same amount of power for the one or more exponentiation operations independent of a value of the key, (b) switching to a time-equalization circuit that takes approximately the same amount of time for the one or more exponentiation operations independent of the value of the key, or (c) switching to a power-equalization and time-equalization circuit that utilizes approximately the same amount of power and time for the one or more exponentiation operations independent of the value of the key.

In an example of using the modular exponentiation function for encryption, a data m and a modulus n may be obtained, wherein the one or more exponentiation operations encrypt the data m to obtain ciphertext c, where c=mkpub modulo n, and kpub=key.

In an example of using the modular exponentiation function for decryption, a data c and a modulus n may be obtained, wherein the one or more exponentiation operations decrypt the data c to obtain a data m, where c=mkpub modulo n, and kpub=key.

In an example of using the modular exponentiation function for cryptographic signing, a message m and a modulus n is obtained, and the one or more exponentiation operations sign the message m with a private key kpriv to obtain a signature s, where s=mkpriv modulo n, and kpriv=key.

In an example of using the modular exponentiation function for cryptographic authentication, a signature s and a modulus n may be obtained, and the one or more exponentiation operations authenticate the signature s with a public key kpub to obtain a message m, where m=skpub modulo n, and kpub=key.

A modular exponentiation circuit is provided comprising a register and a processing circuit coupled to the register. The register may serve to obtain a key as a parameter when a modular exponentiation operation is invoked.

The processing circuit configured to: (a) ascertain whether the key is greater than L bits long, where L is a positive integer, (b) implement a countermeasure against an attack if the key is greater than L bits long, and/or (c) perform one or more exponentiation operations using the key. The processing circuit may implement the countermeasure if the key is greater than L bits long, otherwise the one or more exponentiation operations bypass the countermeasure.

In one example, the processing circuit may be configured to implement the countermeasure by applying cryptographic blinding to the key.

In another example, the processing circuit may include at least one of: (a) a power-equalization circuit that utilizes approximately the same amount of power for the one or more exponentiation operations independent of a value of the key, (b) a time-equalization circuit that takes approximately the same amount of time for the one or more exponentiation operations independent of the value of the key, and/or (c) a power-equalization and time-equalization circuit that utilizes approximately the same amount of power and time for the one or more exponentiation operations independent of the value of the key.

BRIEF DESCRIPTION OF THE DRAWINGS

FIG. 5 illustrates various examples of exponentiation operations that may be performed with auto-selected countermeasures.

DETAILED DESCRIPTION

Figure 1:
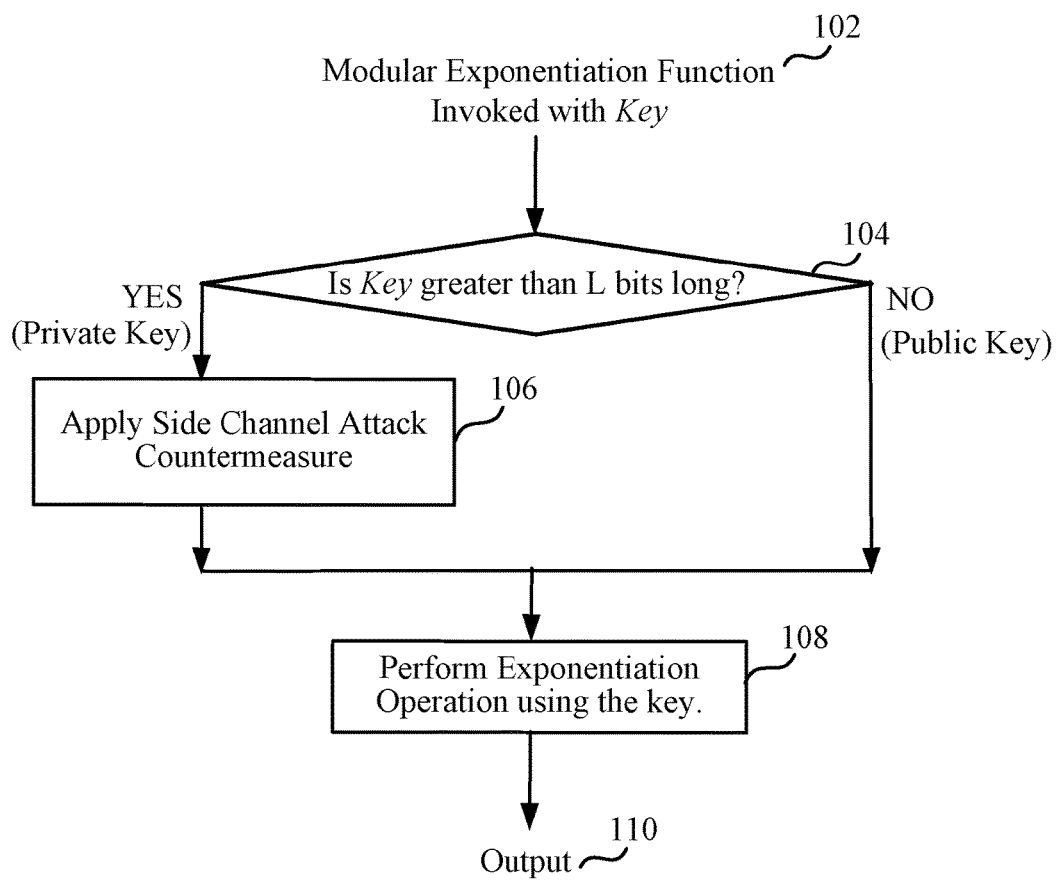
FIG. 1 is a block diagram illustrating a general method that may be implemented by a modular exponentiation function to decide whether or not to apply countermeasures when performing an exponentiation operation.

In the following description, specific details are given to provide a thorough understanding of the described implementations. However, it will be understood by one of ordinary skill in the art that the implementations may be practiced without these specific details. For example, circuits may be shown in block diagrams in order not to obscure the implementations in unnecessary detail. In other instances, well-known circuits, structures and techniques may be shown in detail in order not to obscure the implementations.

The word "exemplary" is used herein to mean "serving as an example, instance, or illustration." Any implementation or embodiment described herein as "exemplary" is not necessarily to be construed as preferred or advantageous over other embodiments. Likewise, the term "embodiments" does not require that all embodiments include the discussed feature, advantage or mode of operation.

Overview

A modular exponentiation function is defined that automatically, transparently, and/or implicitly applies an attack countermeasure (e.g., side channel attack countermeasure) depending on whether a public exponent (public key) or private exponent (private key) is being used. The modular exponentiation function may automatically detect whether an input (i.e., a public exponent/key or a private exponent/key) being used is less than or equal to L bits long (e.g., 8 bits or 1 byte, 16 bits or 2 bytes, 24 bits or 3 bytes, etc.), where L is a positive integer. It is implicit in this approach that public exponents/keys will always be shorter than (or equal to) L bits and private exponents/keys are always longer than L bits. Having a smaller public exponent (e.g., public key) is common practice in RSA, with significant benefit to accelerate decryption and authentication. Second, if the detected input (i.e., exponent/key) is less than or equal to L bits long, then no countermeasures are implemented (i.e., it's a public key so security is not a concern). Otherwise, if the input is longer than L bits it is assumed to be a private exponent/key and one or more countermeasures are implemented. That is, when the modular exponentiation function is invoked with an input (i.e., exponent/key) longer than L bits, a countermeasure may be switched ON to protect such private exponent (private key) from being exposed. By doing so, any key (exponent) longer than L bits will be protected by default. There is no need to add a separate countermeasure parameter/indicator/register/flag at the cipher level (i.e., it is done internally by the modular exponentiation function).

Exemplary Modular Exponentiation Operation

One example of modular exponentiation is utilized in the generation of cryptographic keys (e.g., public and private key pairs). For example, in RSA cryptographic key generation, a public key and corresponding private key are generated by obtaining two distinct prime numbers p and q. Then a number n is computed as n=p·q, where n is the RSA modulus for the public key and private key. A totient F(n) is also computed, where F(n)=(p−1)(q−1), and the function F may be, for example, the Euler totient function or the Euler phi-function. An integer e (i.e., known as the public exponent or public key) is then selected such that 1<e<F(n) and e is coprime to F(n) (i.e., e and (F(n) share no factors other than 1). The integer e may be randomly selected or may be selected to be small such that e=216+1 or e=3 or e=17. A unique integer d (i.e., known as the private exponent or private key) is computed such that 1<d<F(n) and d·e=1 modulo F(n). The modulus n and the public exponent e (i.e., public key) are made public, while the prime numbers p and q and the private exponent d (i.e., private key) are kept secret/private.

Similarly, cryptographic key generation using the Diffie-Hellman algorithm uses a public exponent and a private exponent.

In one example, the public key (i.e., integer e) and private key (i.e., integer d) may be used for encrypting and decrypting information. For instance, for a modulus n, to encrypt a message m (where m<n) using a public key kpub, then a ciphertext c=m$^{kpub}$ modulo n. Here, the modulo operation finds the remainder of the division of m$^{kpub}$ by n. Similarly, for the modulus n, to decrypt the ciphertext c using a private key kpriv, the message m=c$^{kpriv}$ modulo n. Here, the modulo operation finds the remainder of the division of c$^{kpriv}$ by n.

In another example, for the modulus n, to sign a message m (where m<n) using a private key kpriv, the signature s=m$^{kpriv}$ mod n. Similarly, to verify the signature s using a public key kpub, the message m=s$^{kpub}$ mod n.

In this manner, the public key kpub and private key kpriv may serve as the exponent in these ciphers based on modular exponentiation.

Exemplary Modular Exponentiation Function with Auto-Selected Countermeasures

According to one aspect, a modular exponentiation function is defined that implicitly detects whether it is being invoked with a public key or a private key and automatically implements countermeasures depending on whether it is being invoked with a public key or private key. In this approach, inputs to the modular exponentiation function are shorter than (or equal to) L bits if being invoked to obtain a public exponent (i.e., for a public key) and they are longer than L bits if being invoked to obtain a private exponent (i.e., for a private key), where L is a positive integer value (e.g., 1, 2, ... 16, ... 24, ... 32, ... 48, ... 64).

In the example given above, the input for a public exponent is integer e and the input for a private exponent is integer d. These integers may be selected such that 1<d<F(n) and d·e=1 modulo F(n). One advantage to use RSA is that it's public exponent (public key) can be optimized to be very small while the full size private key is where security is located. Many commercial versions of the RSA cipher use RSA public keys no bigger than 3 bytes long (i.e., 24 bits long), in order to achieve good/fast performance. Two of the most common public exponents used in actual implementations are 0x3 and 0x10001.

FIG. 1 is a block diagram illustrating a general method that may be implemented by a modular exponentiation function to decide whether or not to apply countermeasures when performing an exponentiation operation. This modular exponentiation function may be part of a software library or operating system that is invoked by other software to perform exponentiation operations. For example, the modular exponentiation function may be invoked with a public key or a private key 102 to perform a cryptographic operation, such as encrypting data, decrypting data, signing data, or authenticating data. Upon being invoked with a key 102, the modular exponentiation function may (internally) ascertain whether the key is greater than L bits long 104. In this implementation, it is assumed that public keys (e.g., no security or lower security) will be no more than L bits long and that private keys (e.g., secure) will be longer than L bits long. Consequently, if the key is longer than L bits, it is a private key, and countermeasure against side channel attacks (or other countermeasures) will be applied 106. Otherwise, if the key is no longer than L bits, it is a public key and no countermeasure is applied. In this manner, the modular exponentiation function may determine whether to apply side channel attack countermeasures or not.

In a side channel attack, the value of the key may be exposed or ascertained by, for example, ascertaining the power or timing of an operation being performed. By running multiple tests with different key values to ascertain timing and/or power used in such operation for each key value tested, it may be feasible to subsequently determine another key being used by a different exponentiation operation. Consequently, the countermeasure 106 may include additional operations, circuit paths, etc., that inhibit or prevent the key from being disclosed by power analysis and/or timing analysis. For instance, the countermeasure 106 may assure that approximately the same amount of power is consumed for all keys used when invoking the modular exponentiation function (e.g., a circuit paths may be matched to have the same number of transistors, etc., so they consume approximately the same amount of power and take approximately the same time). Alternatively, the countermeasure may add blinding to randomize the computational cost of modular exponentiation. That is, by randomizing the computational resources (e.g., power or time) used for different keys (or other inputs), it prevents an attacker from gaining useful side channel information.

An exponentiation operation is then performed using the key 108, such as encrypting data, decrypting data, signing data, and/or authenticating data, to obtain an output 110.

Figure 2:
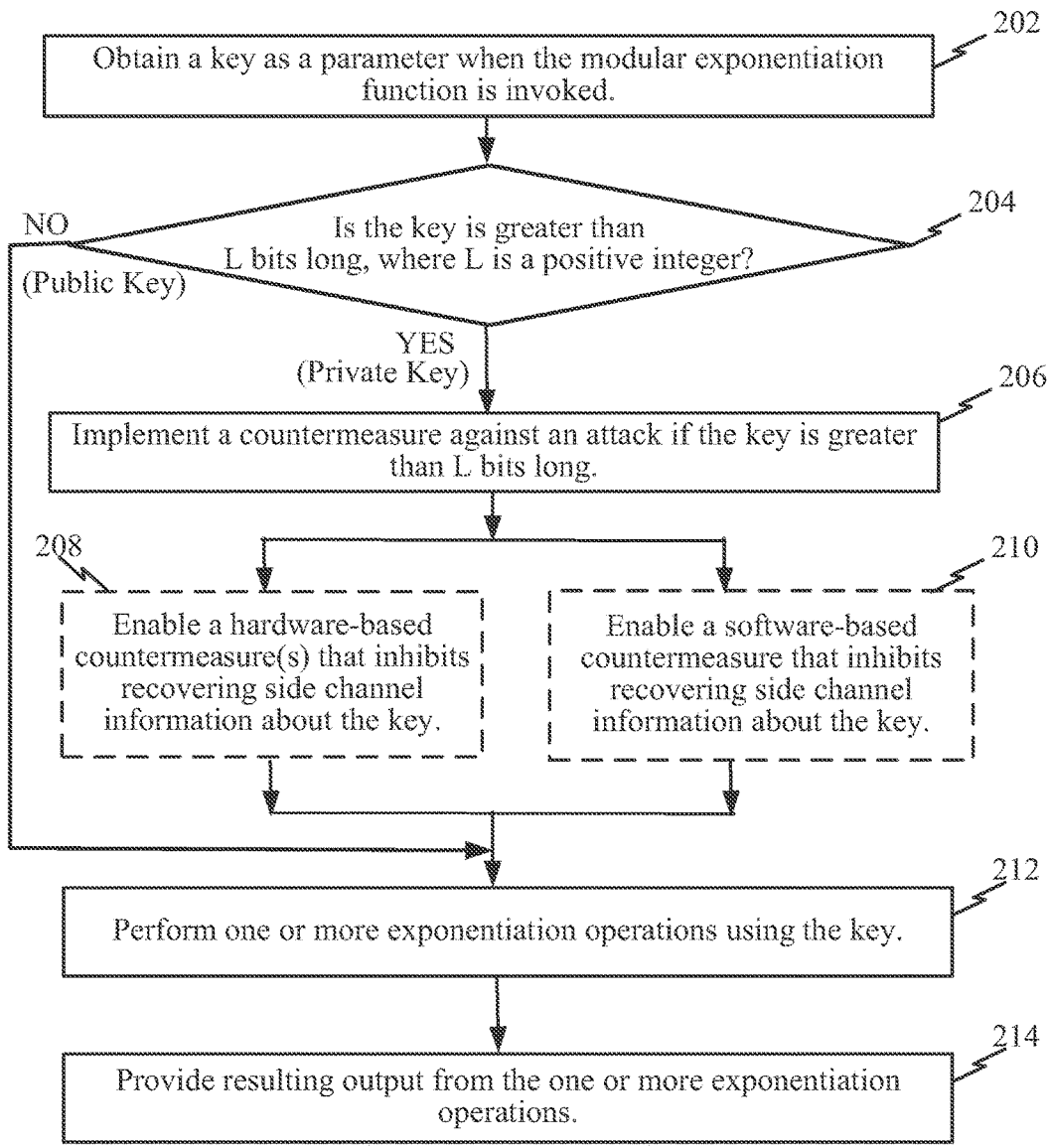
FIG. 2 illustrates a method of implementing security in a modular exponentiation function for cryptographic operations.

FIG. 2 illustrates a method of implementing security in a modular exponentiation function for cryptographic operations. A key is obtained as a parameter when the modular exponentiation function is invoked 202. In one example, the key may be one of either a public key or a private key of a cryptographic key pair. Within the modular exponentiation function, it is then ascertained whether the key is greater than L bits long, where L is a positive integer 204. For instance, L may be equal to 3 bytes (i.e., 24 bits) in one example.

If the key is greater than L bits long, then a countermeasure (e.g., one or more countermeasures) may be implemented against an attack 206. Therefore, the length of the key implicitly indicates the level/amount/extent of the countermeasure(s) that should be implemented. In one example, public keys are no longer than L bits while private keys are always longer than L bits. The countermeasure(s) may include one or more techniques that inhibit or prevent information about the key from being ascertained through analysis (e.g., power analysis and/or timing analysis). Such countermeasure(s) may include a software countermeasure(s), a hardware countermeasure(s), and/or a combination of software/hardware countermeasure(s).

Figure 3:
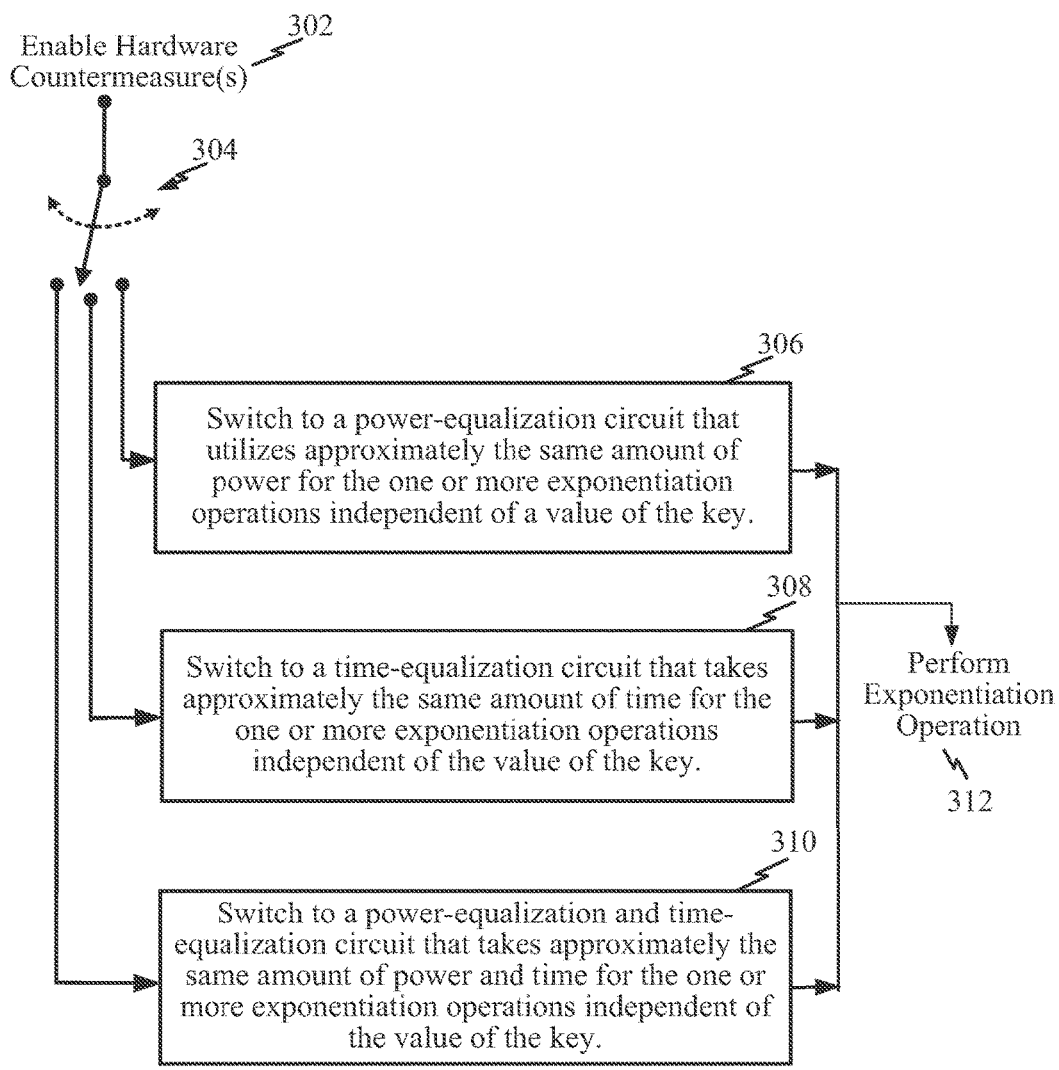
FIG. 3 illustrates examples of hardware countermeasure operations that may be implemented.

FIG. 3 illustrates examples of hardware countermeasure operations that may be implemented. Upon deciding to implement or enable hardware countermeasures 302, one or more selectable 304 hardware countermeasures may be available. In a first example of a countermeasure, the method may switch to (or enable) a power-equalization circuit that utilizes approximately the same amount of power for the one or more exponentiation operations independent of a value of the key 306. In second example, the method may switch to (or enable) a time-equalization circuit that takes approximately the same amount of time for the one or more exponentiation operations independent of the value of the key 308. In a third example, the method may switch to (or enable) a power-equalization and time-equalization circuit that utilizes approximately the same amount of power and time for the one or more exponentiation operations independent of the value of the key 310. The exponentiation operation 312 may then be performed. In one example, such power-equalization circuit and/or time-equalization circuit may add circuit path length, delays, and/or transistors to a computational path so that computations/operations using different key values take approximately the same power and/or time. However, if the key is less than or equal to L bits long, then the countermeasures are bypassed.

Figure 4:
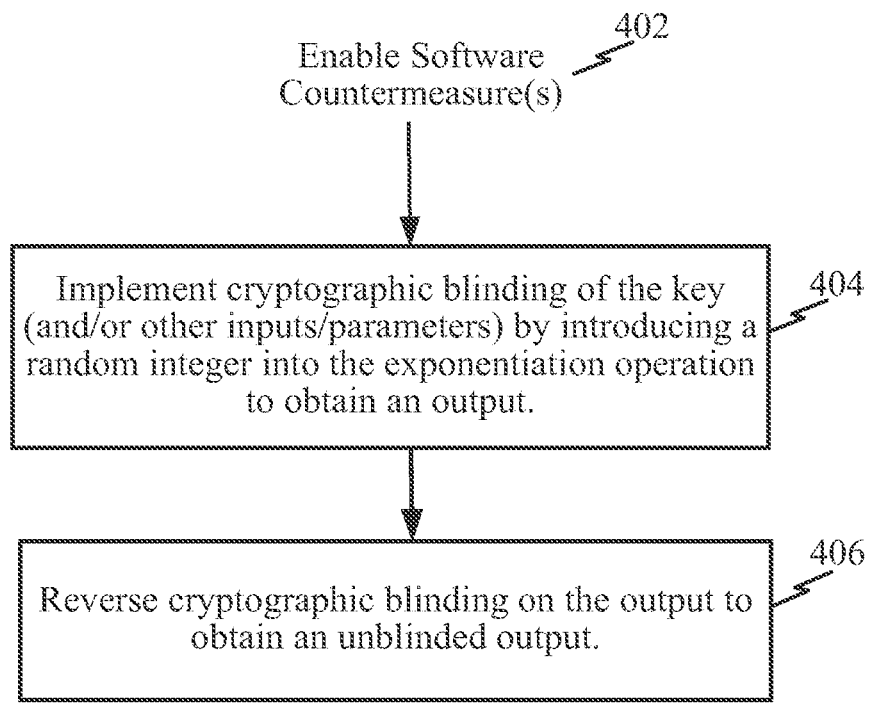
FIG. 4 illustrates an example of software countermeasure operations that may be implemented.

FIG. 4 illustrates an example of software countermeasure operations that may be implemented. Upon deciding to enable software countermeasures 402, cryptographic blinding of the key (and/or other inputs/parameters) may be implemented by introducing a random integer into the exponentiation operation to obtain an output 404. Then, a reverse cryptographic blinding on the output to obtain an unblinded output 406.

One example of such cryptographic blinding for RSA involves computing the blinding operation $E(x)=(xr)^e$ mod n, where r is a random integer between 1 and n and relatively prime to n (i.e. gcd(r,n)=1), x is the plaintext, kpub is the public RSA exponent/key and n is the RSA modulus. The decryption function $f(z)=z^d$ mod n is applied thus giving $f(E(x))=(xr)^{ed}$ mod n=xr mod n. Finally, it is unblinded using the function $D(z)=zr^{-1}$ mod n. Multiplying xr mod N by $r^{-1}$ mod n yields x, as the desired output. When decrypting in this manner, an attacker who is able to measure time taken by this operation would not be able to make use of this information (e.g., by applying timing attacks RSA is known to be vulnerable to) as the attacker does not know the random integer r and hence has no knowledge of the real input fed to the RSA primitives.

Referring again to FIG. 2, one or more exponentiation operations may then be performed using the key 212.

In some implementations, both hardware and software countermeasures may be implemented or enabled together.

FIG. 5 illustrates various examples of exponentiation operations that may be performed with auto-selected countermeasures.

In one example, the same modular exponentiation function may perform encryption and decryption operations but with different keys. For instance, a data m and a modulus n may be obtained, and the exponentiation operation encrypts the data m to obtain ciphertext c, where $c=m^{kpub}$ modulo n, and kpub=key 502. In another example, a data c and a modulus n may be obtained, wherein the exponentiation operation decrypts the data c to obtain a data m, where $c=m^{kpub}$ modulo n, and kpub=key 504.

Similarly, the same modular exponentiation function may perform cryptographic signing and authentication. For instance, a message m and a modulus n may be obtained, and the exponentiation operation signs the message m with a private key kpriv to obtain a signature s, where $s=m^{kpriv}$ modulo n, and kpriv=key 506. In another example, a signature s and a modulus n is obtained, and the exponentiation operation authenticates the signature s with a public key kpub to obtain a message m, where $m=s^{kpub}$ modulo n, and kpub=key 508.

In this manner, when the modular exponentiation function is invoked with a key longer than L bits, countermeasures are switched ON to protect such private keys or exponents. By doing so, any key (or exponent) longer than L bits will be protected by default. There is no need to add a separate countermeasure parameter/indicator at the cipher level as it is done internally by the modular exponentiation function. Since modular exponentiation is a basic mathematical operation in software libraries, legacy code for different ciphers will be protected transparently as a result of implementing a modular exponentiation function with auto-selected countermeasures (e.g., when the input key is greater than L bits long, countermeasures are implemented automatically).

In one example, this approach avoids unnecessary performance regression on RSA public key use, because the RSA public key is usually no longer than 3 bytes (i.e., 24 bits). On the other hand, if any cryptographic system prefers not to optimize public keys for performance (i.e., uses a public key or exponent bigger than 3 bytes or 24 bits), the additional latency caused by countermeasures will not be noticeable anyway.

This approach is also particularly useful to patch an existing or legacy crypto library where it is hard to modify cipher-specific code. Updating the modular exponentiation function in a software library provides a way to transparently patch. In addition to RSA, Diffie-Hellman Key Agreement and Digital Signature Algorithm (DSA) signature signing may be protected by this same approach.

Figure 6:
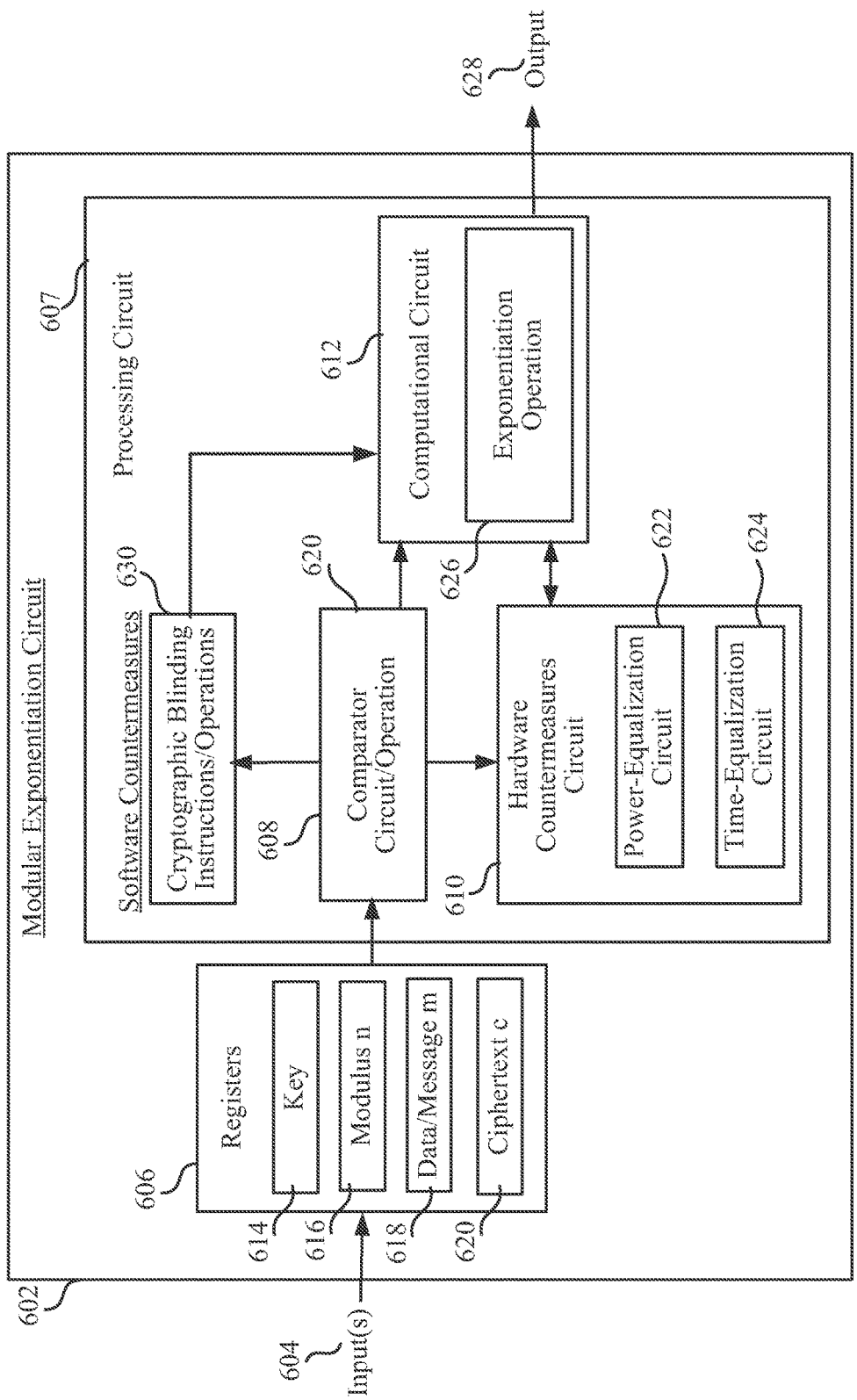
FIG. 6 illustrates a block diagram of an exemplary modular exponentiation circuit configured to implement a countermeasure against a side channel attack.

FIG. 6 illustrates a block diagram of an exemplary modular exponentiation circuit configured to implement a countermeasure against a side channel attack. The modular exponentiation circuit 602 may include one or more registers 606 and a processing circuit 607. The processing circuit 607 may include a comparator circuit 608, a hardware countermeasures circuit 610, and/or a computational circuit 612. The registers 606 may include input registers to receive/obtain one or more inputs 604 (e.g., parameters), such as an input key 614, a modulus n 616, a data/message m 618, and/or a ciphertext c 620. In one example, the register 606 may serve to pass the key 614 as a parameter when a modular exponentiation operation is invoked. The comparator circuit 608 may serve to ascertain whether the key is greater than L bits long, where L is a positive integer. The hardware countermeasures circuit 610 may be configured to implement a countermeasure (e.g., one or more countermeasures) against an attack if the key is greater than L bits long. In one example, the countermeasures circuit 610 may include a power-equalization circuit 622 and/or a time-equalization circuit 624. Additionally, the processing circuit 607 may also be configured to implement software countermeasures, such as cryptographic blinding 630 of the key. The computational circuit 612 may be configured to perform one or more exponentiation operations 626 using the key to provide an output 628.

In example, the computational circuit 612 may use the countermeasures circuit 610 if the key is greater than L bits long, otherwise the one or more exponentiation operations bypass the countermeasures circuit 610.

In some implementations, the power-equalization circuit 622 may utilize approximately the same amount of power for the one or more exponentiation operations independent of a value of the key. Similarly, the time-equalization circuit 624 may take approximately the same amount of time for the one or more exponentiation operations independent of the value of the key. In other implementations a power-equalization and time-equalization circuit may utilize approximately the same amount of power and time for the one or more exponentiation operations independent of the value of the key.

One or more of the components, steps, features and/or functions illustrated in the figures may be rearranged and/or combined into a single component, step, feature or function or embodied in several components, steps, or functions. Additional elements, components, steps, and/or functions may also be added without departing from the invention. The apparatus, devices, and/or components illustrated in FIG. 6 may be configured to perform one or more of the methods, features, or steps described in FIGS. 1 and/or 2. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable storage medium", "computer-readable storage medium", and/or "processor-readable storage medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method of implementing security in a modular exponentiation function for cryptographic operations, comprising:
    obtaining a key as a parameter when the modular exponentiation function is invoked;
    ascertaining, within the modular exponentiation function, whether the key is greater than L bits long, where L is a positive integer;
    implementing a countermeasure against an attack if the key is greater than L bits long; and
    performing one or more exponentiation operations using the key.

2. The method of claim 1, wherein the key is one of either a public key or a private key of a cryptographic key pair.

3. The method of claim 1, wherein L=3 bytes.

4. The method of claim 1, wherein the same modular exponentiation function performs encryption and decryption operations but with different keys.

5. The method of claim 1, wherein the countermeasure include one or more techniques that inhibit or prevent information about the key from being ascertained through analysis.

6. The method of claim 1, wherein the countermeasure includes cryptographic blinding of the key.

7. The method of claim 1, wherein implementing the countermeasure includes at least one of:
    switching to a power-equalization circuit that utilizes approximately the same amount of power for the one or more exponentiation operations independent of a value of the key,
    switching to a time-equalization circuit that takes approximately the same amount of time for the one or more exponentiation operations independent of the value of the key, or
    switching to a power-equalization and time-equalization circuit that utilizes approximately the same amount of power and time for the one or more exponentiation operations independent of the value of the key.

8. The method of claim 1, further comprising:
    bypassing the countermeasure if the key is less than or equal to L bits long.

9. The method of claim 1, further comprising:
    obtaining a data m and a modulus n, wherein the one or more exponentiation operations encrypt the data m to obtain ciphertext c, where $c=m^{kpub}$ modulo n, and kpub=key.

10. The method of claim 1, further comprising:
    obtaining a data c and a modulus n, wherein the one or more exponentiation operations decrypt the data c to obtain a data m, where $c=m^{kpub}$ modulo n, and kpub=key.

11. The method of claim 1, further comprising:
    obtaining a message m and a modulus n, and the one or more exponentiation operations sign the message m with a private key kpriv to obtain a signature s, where $s=m^{kpriv}$ modulo n, and kpriv=key.

12. The method of claim 1, further comprising:
obtaining a signature s and a modulus n, and the one or more exponentiation operations authenticate the signature s with a public key kpub to obtain a message m, where m=s$^{kpub}$ modulo n, and kpub=key.

13. A machine-readable storage medium having one or more instructions for implementing security in a modular exponentiation function which when executed by at least one processing circuit causes the at least one processing circuit to:
obtain a key as a parameter when the modular exponentiation function is invoked;
ascertain, within the modular exponentiation function, whether the key is greater than L bits long, where L is a positive integer;
implement a countermeasure against an attack if the key is greater than L bits long; and
perform one or more exponentiation operations using the key.

14. The machine-readable storage medium of claim 13, wherein the key is one of either a public key or a private key of a cryptographic key pair.

15. The machine-readable storage medium of claim 13, wherein the same modular exponentiation function performs encryption and decryption operations but with different keys.

16. The machine-readable storage medium of claim 13, wherein the countermeasure includes one or more techniques that inhibit or prevent information about the key from being ascertained through analysis.

17. The machine-readable storage medium of claim 13, wherein the countermeasure includes cryptographic blinding of the key.

18. The machine-readable storage medium of claim 13, wherein implementing the countermeasure includes at least one of:
switch to a power-equalization circuit that utilizes approximately the same amount of power for the one or more exponentiation operations independent of a value of the key,
switch to a time-equalization circuit that takes approximately the same amount of time for the one or more exponentiation operations independent of the value of the key, or
switch to a power-equalization and time-equalization circuit that utilizes approximately the same amount of power and time for the one or more exponentiation operations independent of the value of the key.

19. The machine-readable storage medium of claim 13, further having one or more instructions which when executed by at least one processing circuit causes the at least one processing circuit to:
bypass the countermeasure if the key is less than or equal to L bits long.

20. A device comprising:
means for obtaining a key as a parameter when a modular exponentiation function is invoked;
means for ascertaining, within the modular exponentiation function, whether the key is greater than L bits long, where L is a positive integer;
means for implementing a countermeasure against an attack if the key is greater than L bits long; and
means for performing one or more exponentiation operations using the key.

21. The device of claim 20, wherein the means for implementing the countermeasure includes at least one of:
means for switching to a power-equalization circuit that utilizes approximately the same amount of power for the one or more exponentiation operations independent of a value of the key,
means for switching to a time-equalization circuit that takes approximately the same amount of time for the one or more exponentiation operations independent of the value of the key, or
means for switching to a power-equalization and time-equalization circuit that utilizes approximately the same amount of power and time for the one or more exponentiation operations independent of the value of the key.

22. A modular exponentiation circuit, comprising:
a register to obtain a key as a parameter when a modular exponentiation operation is invoked; and
a processing circuit coupled to the register, the processing circuit configured to ascertain whether the key is greater than L bits long, where L is a positive integer, implement a countermeasure against an attack if the key is greater than L bits long, and
perform one or more exponentiation operations using the key.

23. The modular exponentiation circuit of claim 22, wherein the processing circuit implements the countermeasure if the key is greater than L bits long, otherwise the one or more exponentiation operations bypass the countermeasure.

24. The modular exponentiation circuit of claim 22, wherein the processing circuit is configured to implement the countermeasure by applying cryptographic blinding to the key.

25. The modular exponentiation circuit of claim 22, wherein the processing circuit includes at least one of:
a power-equalization circuit that utilizes approximately the same amount of power for the one or more exponentiation operations independent of a value of the key,
a time-equalization circuit that takes approximately the same amount of time for the one or more exponentiation operations independent of the value of the key, or
a power-equalization and time-equalization circuit that utilizes approximately the same amount of power and time for the one or more exponentiation operations independent of the value of the key.

* * * * *